E. J. SMOTHERS, O. S. BANKS AND J. GOLOBICH.
TROLLEY WHEEL.
APPLICATION FILED NOV. 17, 1921.
1,404,664. Patented Jan. 24, 1922.
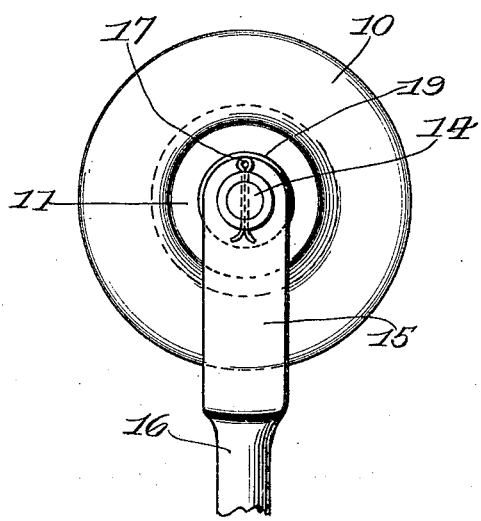
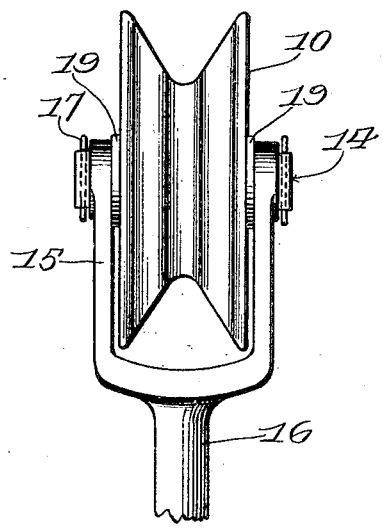
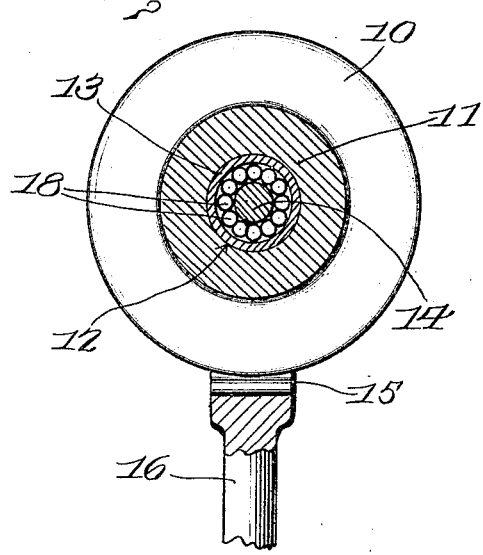
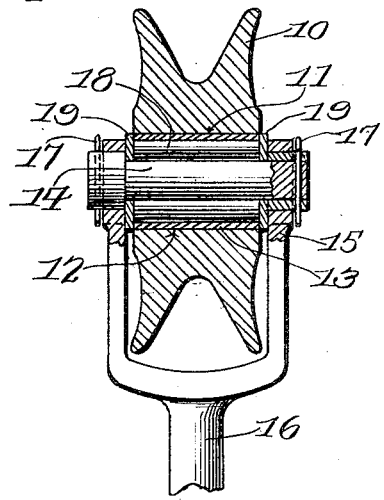
Inventor
Elisha J. Smothers,
Oliver S. Banks,
and Joseph Golobich

UNITED STATES PATENT OFFICE.

ELISHA J. SMOTHERS, OLIVER S. BANKS, AND JOSEPH GOLOBICH, OF PITTSBURGH, PENNSYLVANIA.

TROLLEY WHEEL.

1,404,664.

Specification of Letters Patent. Patented Jan. 24, 1922.

Application filed November 17, 1921. Serial No. 515,864.

*To all whom it may concern:*

Be it known that we, ELISHA J. SMOTHERS, OLIVER S. BANKS, and JOSEPH GOLOBICH, citizens of the United States, residing at Pittsburgh, in the county of Allegheny, State of Pennsylvania, have invented certain new and useful Improvements in Trolley Wheels; and we do hereby declare the following to be a full, clear, and exact description of the invention, such as will enable others skilled in the art to which it appertains to make and use the same.

The object of the invention is to provide a simple and relative durable trolley wheel for use particularly in connection with city and suburban car lines wherein the friction incident to operation is minimized and the replacement of worn parts facilitated without resorting to the use of complicated means and wherein a repair of the structure involving such replacement may be accomplished without resort to the use of special tools; and with this object in view, the invention consists in a construction, combination and relation of parts of which a preferred embodiment is illustrated in the accompanying drawing wherein:

Figure 1 is a side view,

Figure 2 is an edge view of a trolley wheel embodying the invention and mounted upon a conventional trolley pole, Figure 3 is a diametrical sectional view, and Figure 4 is a section taken at right angles to the plane of Figure 3.

The wheel 10 which may be of any preferred dimensions to suit the specific purpose for which it is designed, and which may have a rim contour of any approved shape, is provided with a hub portion 11 having a central opening 12 in which is fitted a tubular lining 13 of steel or especially hardened metal in the form of a sleeve, which being snugly fitted in the opening of the hub is flush at its extremities with the side surfaces thereof. The wheel spindle or axle 14 which is adapted to be carried by the fork 15 of the trolley pole 16 of any approved construction is provided with stops engaging its extremities for limiting the lateral or axial movement of the wheel thereon and one of which is preferably removable to permit of inserting and removing the spindle to mount or dismount the wheel, the illustrated embodiment of the invention contemplating the use of split keys 17 as stops, which with the conventional form of trolley pole and fork or harp are arranged outside of the arms of the latter, as shown in Figure 2.

Interposed between the hub lining and the surface of the spindle is a series of steel rollers 18 of even diameter throughout and with their extremities flush with the ends of the sleeve or lining which are closed by flat washers 19 consisting of discs which are arranged in contact with the end facings of the hub.

With this construction, as will be obvious, the wheel proper with its hub lining or sleeve rotates independently of the spindle upon the bearing afforded by the antifriction rollers, to avoid any tendency to wearing of the spindle at its points of attachment to or mounting upon the trolley harp, and to replace a worn sleeve or lining or one or more of the rollers, it is only necessary to disconnect the spindle from the trolley pole by the removal of one of the stops which serve to retain the parts of the wheel, including the washers, in their proper relative positions.

What is claimed is:

1. A trolley wheel having a central opening provided with a tubular lining of wear resisting material terminally flush with the side surfaces of the wheel, a pole supported spindle having terminal stops, one of which is removable, rollers interposed between the sleeve and the spindle and terminally flush with the ends of the former, and washers bearing against and closing the ends of the sleeve and held in roller retaining position by said stops.

2. A trolley wheel having a central opening provided with a tubular lining of wear resisting material terminally flush with the side surfaces of the wheel, a pole supported spindle having terminal stops, one of which is removable, rollers interposed between the sleeve and the spindle and terminally flush with the ends of the former, and washers bearing against and closing the ends of the sleeve and held in roller retaining position by said stops, said lining and spindle being secured in fixed position respectively with relation to the wheel and pole.

In testimony whereof, we affix our signatures, in the presence of a witness.

ELISHA J. SMOTHERS.
OLIVER S. BANKS.
JOSEPH GOLOBICH.

Witness:
W. A. YOUNG.